US010289511B2

(12) United States Patent
Takla

(10) Patent No.: US 10,289,511 B2
(45) Date of Patent: May 14, 2019

(54) DIFFERENTIAL PHYSICAL LAYER DEVICE WITH TESTING CAPABILITY

(71) Applicant: Ashraf K. Takla, San Jose, CA (US)

(72) Inventor: Ashraf K. Takla, San Jose, CA (US)

(73) Assignee: Mixel, Inc., San Jose, CA (US)

( * ) Notice: Subject to any disclaimer, the term of this patent is extended or adjusted under 35 U.S.C. 154(b) by 326 days.

(21) Appl. No.: 15/241,265

(22) Filed: Aug. 19, 2016

(65) Prior Publication Data

US 2018/0052752 A1 Feb. 22, 2018

(51) Int. Cl.
*H04B 3/46* (2015.01)
*G06F 11/22* (2006.01)

(52) U.S. Cl.
CPC ........ *G06F 11/2273* (2013.01); *G06F 11/221* (2013.01)

(58) Field of Classification Search
CPC ... H04L 1/205; H04L 1/242; H04L 25/03878; H04L 43/50; H04B 1/7183; H04B 3/46; H04B 17/00; G06F 11/221; G06F 11/2273
USPC ......................... 375/219, 224, 357, 354–355
See application file for complete search history.

(56) References Cited

U.S. PATENT DOCUMENTS 6,470,404 B1 * 10/2002 Kim ..................... G06F 13/385 710/106
6,901,471 B2 * 5/2005 Govindaraman ..... G06F 13/385 710/105
7,200,170 B1 * 4/2007 Desandoli ................ H04B 3/46 370/241
8,705,605 B1 * 4/2014 Raman .................... H04L 1/243 375/232
2001/0043648 A1 * 11/2001 Ducaroir .................. H04B 3/46 375/224
2004/0036494 A1 * 2/2004 Mak ....................... G01R 29/26 324/750.3
2004/0205416 A1 * 10/2004 Shirota .................. H04L 43/50 714/48
2004/0250180 A1 * 12/2004 Hotta ............... G01R 31/31716 714/699
2012/0192043 A1 * 7/2012 Jiang ................ G01R 31/31716 714/799
2015/0019898 A1 * 1/2015 Hayakawa ........... H04L 7/0332 713/400
2016/0334503 A1 * 11/2016 Ginsburg ............. G01S 7/4004
2017/0139866 A1 * 5/2017 Wallace ............. G06F 13/4027

* cited by examiner

*Primary Examiner* — Emmanuel Bayard
(74) *Attorney, Agent, or Firm* — Tran & Associates

(57) ABSTRACT

A circuit includes a receiver having first and second differential input pairs and one differential output pair, the receiver outputting the first differential inputs at the differential outputs in a first mode and applying test signals to the second differential inputs and outputting the second differential inputs at the differential outputs in a second mode; and switches coupled to the first and second differential inputs to disconnect the test input signals from the second differential inputs during the first mode and to disable the receiver input signals by connecting first differential inputs to local core voltage while tri-stating the transmitter on the other side of the link during the second mode.

20 Claims, 6 Drawing Sheets

MXL-DPHY-CSI2-RX+
Global
PPI
Clock
Data
Ctrl
BIST
Control and Interface Logic
CALIBRATOR
CLOCK-TX 220
CLOCK-RX 222
DATAy-RX 230
DATA-TX 232
Loopback Switches
REXT
CKP
CKN
DPy
DNy

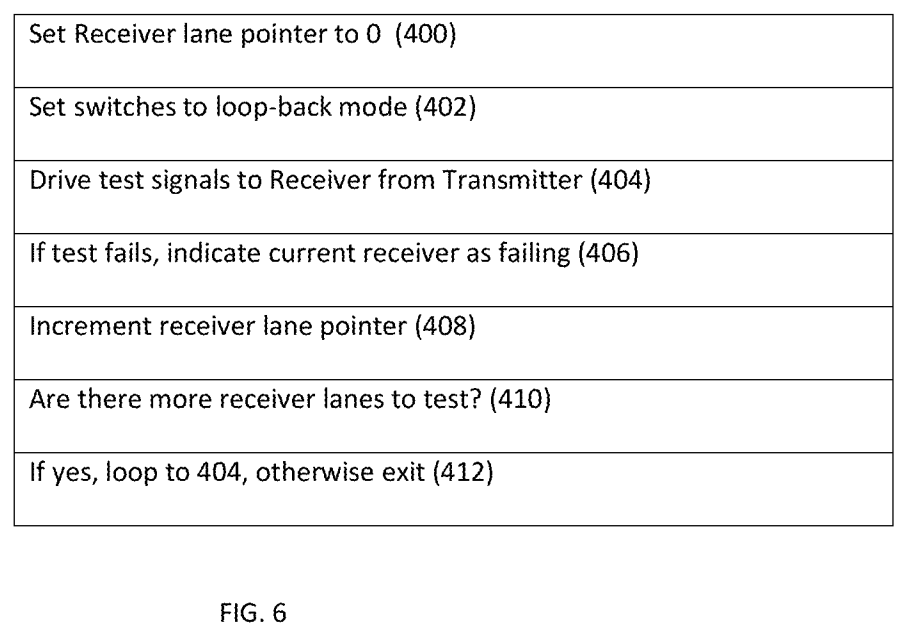

| |
|---|
| Set Receiver lane pointer to 0 (400) |
| Set switches to loop-back mode (402) |
| Drive test signals to Receiver from Transmitter (404) |
| If test fails, indicate current receiver as failing (406) |
| Increment receiver lane pointer (408) |
| Are there more receiver lanes to test? (410) |
| If yes, loop to 404, otherwise exit (412) |

FIG. 6

DIFFERENTIAL PHYSICAL LAYER DEVICE WITH TESTING CAPABILITY

BACKGROUND

The present invention relates to a differential physical layer device with testing.

The physical layer, or PHY, is the heart of any advanced, serial interconnect standard. Very different peripherals often share similar requirements at the PHY level. One standard organization called the MIPI Alliance (MIPI) developed a differential physical (D-PHY) specification as a re-usable physical layer solution upon which MIPI camera interfaces, display panel interfaces, and general-purpose high-speed/low-power interfaces could be based. This helped streamline the development of multiple standards in MIPI, but also benefits the companies implementing these interfaces in semiconductor products, since much of the PHY engineering investment can be re-used on subsequent designs.

The MIPI D-PHY is a low-power, differential signaling solution with a dedicated clock lane and one or more (scalable) data lanes. MIPI D-PHY delivers up to 2.5 Gbps per lane via an advanced source-synchronous, differential SLVS design which is scalable to the number of lanes required by the application—data lanes can optionally operate bidirectionally as needed. It meets the demanding requirements of low-power, low-noise-generation, and high-noise immunity which mobile phone designs demand.

Traditional D-PHY implementation that can support at-speed production test uses the Universal Lane configuration. However, the D-PHY Universal Lane configuration supports testability at the expense of large overhead. The D-PHY universal Lane, shown in FIG. 1, has many blocks connected to the high-speed serial interface (LPTX, HSTX, LPRX, HSRX, LP-CD) resulting in high parasitic cap, not only due to block input capacitance but also due to parasitic interconnect capacitance. This puts an artificial upper limit on data rate.

A D-PHY RX application would require inclusion of both the HS & LP TX in each of the data lanes in addition to the clock lane. This results in a considerable amount of overhead in RX applications, since D-PHY HS and LP TX are significantly larger than the corresponding RX only configuration.

As MIPI expands beyond the traditional mobile platform into safety sensitive applications, such as automotive and medical applications, full-speed, in-system testability and diagnostics are becoming of paramount importance. In safety sensitive applications, cost and risk grow even faster, and the implications of a failing part are intolerable. As electronic component contents rapidly grows in those applications, the cost of failure increases substantially, and detection of any degradation in performance as early as possible is highly desirable. Full-speed production testing enables detection of manufacturing faults and helps drive down the number of defects to zero, as required in safety sensitive applications such as in the automotive industry.

SUMMARY

A circuit includes a receiver having first and second differential input pairs and one differential output pair, the receiver outputting the first differential inputs at the differential outputs in a first mode and applying test signals to the second differential inputs and outputting the second differential inputs at the differential outputs in a second mode; and switches coupled to the first and second differential inputs to disconnect the test input signals from the second differential inputs during the first mode and to disable the receiver input signals by connecting first differential inputs to local core voltage while tri-stating the transmitter on the other side of the link during the second mode.

Advantages of the preferred embodiments may include one or more of the following. The system uses only one transmitter to test all the multiple data channels, thus saving substantial area and standby power, and allowing higher data rate performance by minimizing the capacitive load at the high-speed serial interface pins.

Since the D-PHY TX area is significantly larger than that of RX, the RX+configuration has smaller area and standby current, as only 2 transmitters are need instead of the 5 transmitters that would be needed for a conventional 4 data-lanes Universal lane configuration, resulting in significant reduction in area and standby power reduction. The MIPI D-PHY combines the small area and improved performance of RX configuration with the testability and diagnostics of the Universal configuration; the best of both worlds.

BRIEF DESCRIPTION OF THE DRAWINGS

Other embodiments of the invention will become more fully apparent from the following detailed description, the appended claims, and the accompanying drawings in which like reference numerals identify similar or identical elements.

FIG. 6 shows an exemplary test process using the receivers of FIGS. 2-3.

DESCRIPTION

Figure 1:
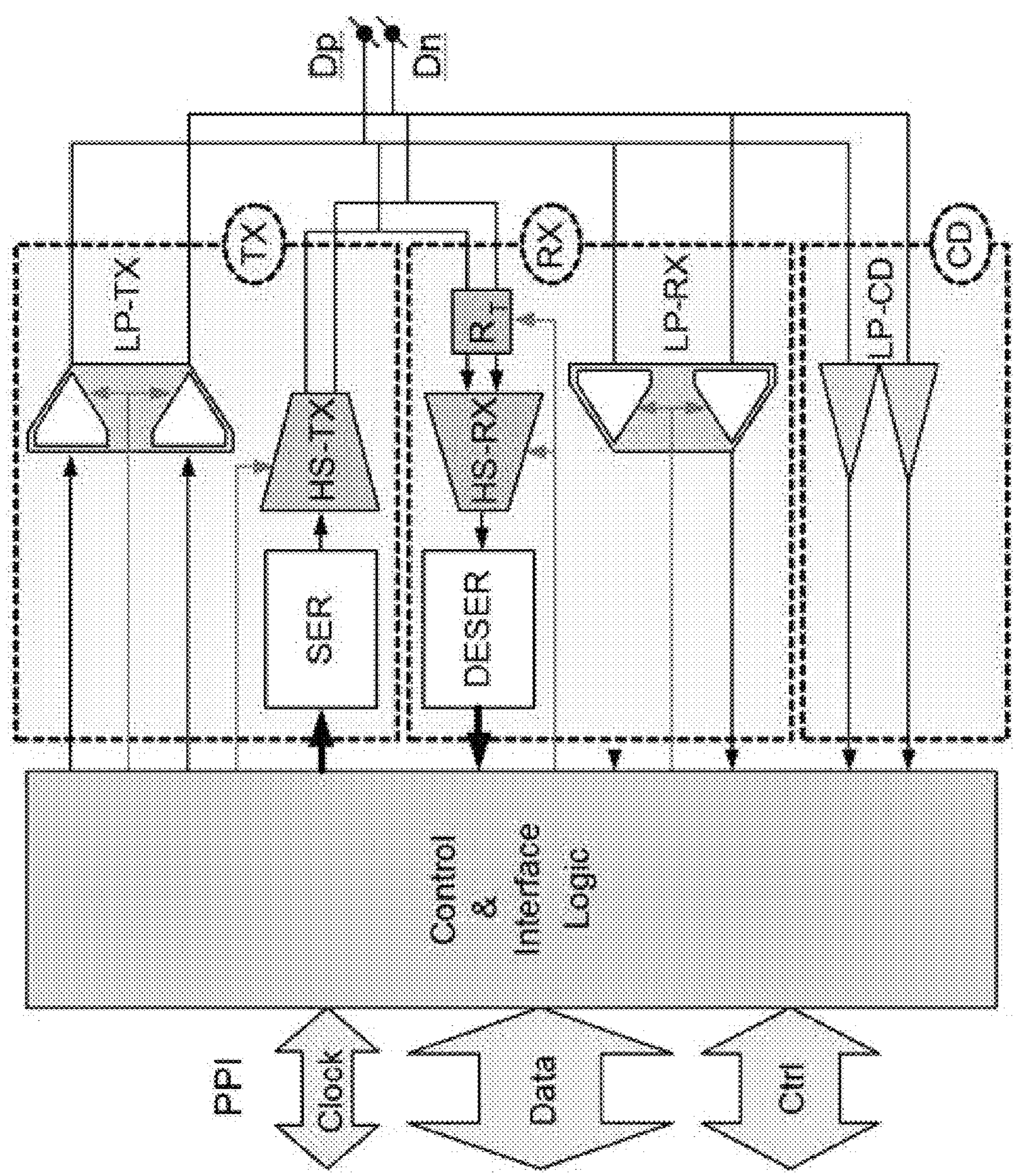
FIG. 1 shows a conventional D-PHY Universal Lane configuration in testing.
Figure 2:
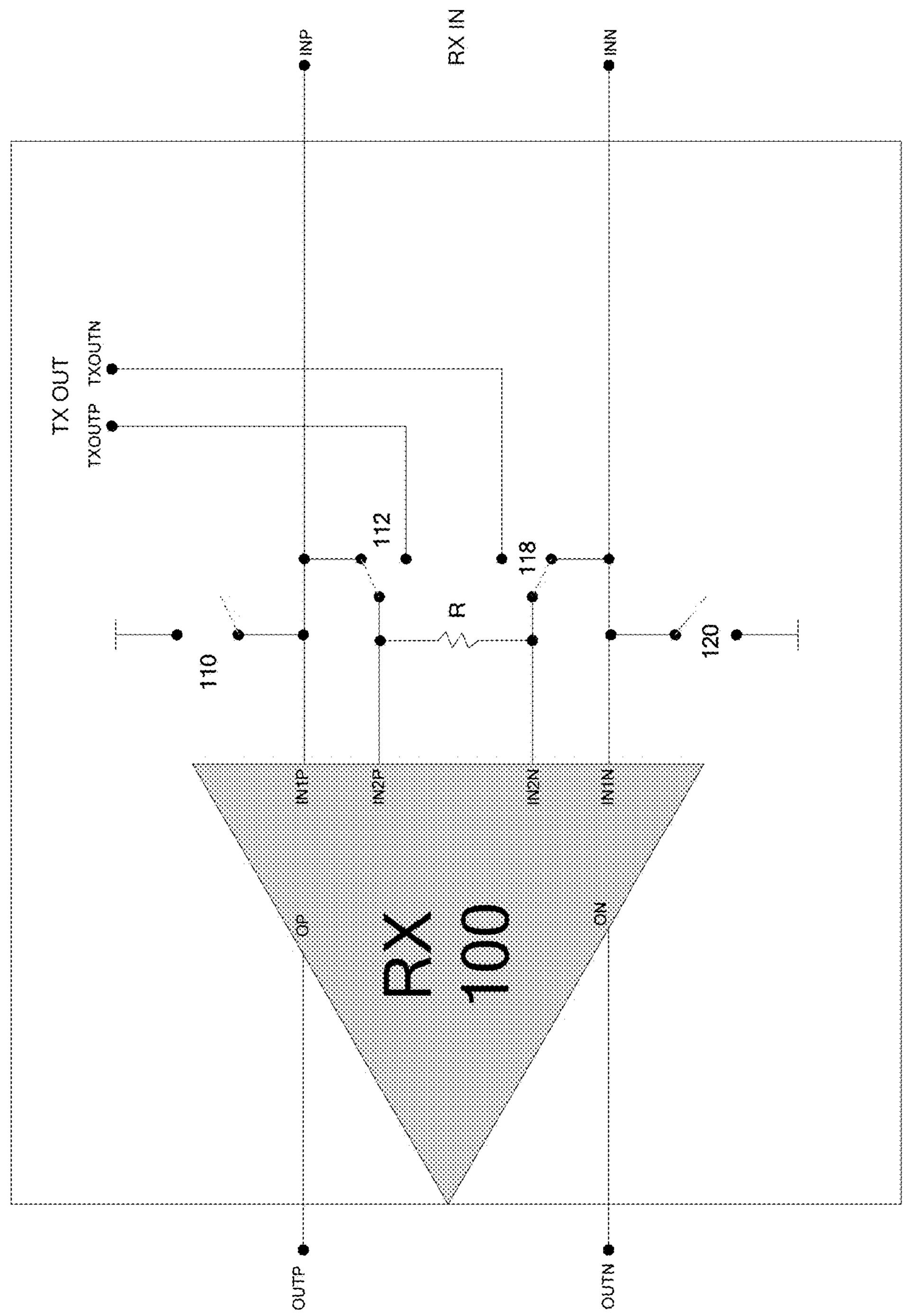
FIG. 2 shows an exemplary MIPI D-PHY receiver in normal operation.
Figure 3:
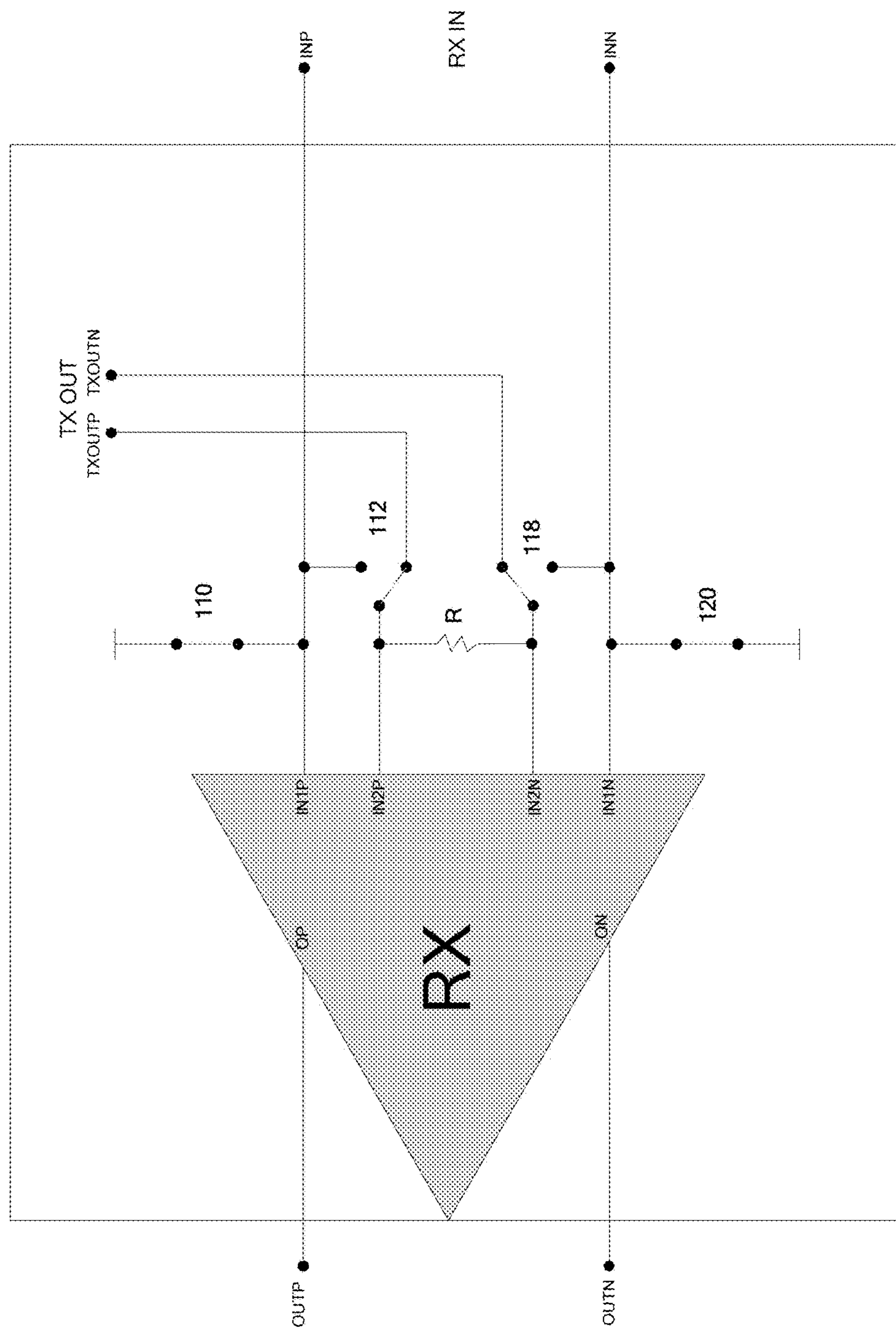
FIG. 3 shows the MIPI D-PHY receiver of FIG. 2 in loop-back mode operation.

FIGS. 2 and 3 show a receiver 100 with a differential inputs INP and INN and differential outputs OUTP and OUTN, respectively. A plurality of differential inputs IN1P, IN2P, IN1N, and IN2N are positioned to configuration enables early detection and diagnosis of faults through the whole life cycle of a particular product from wafer-sort all the way to in-system testability. A plurality of switches 110-120 operate in two modes: a normal operating mode, and loop-back mode for BIST purposes.

The MIPI differential physical (D-PHY) specification dictates the signaling supported by a MIPI-compliant device. According to the MIPI specification, a MIPI D-PHY interface alternately supports two different modes of operation over a single wire pair: a high-speed (HS) mode involving unidirectional (i.e., transmit (TX) or receive (RX)) differential signaling and a low-power (LP) mode involving bidirectional CMOS signaling. Depending on the particular application, a MIPI-compliant device may use a MIPI D-PHY interface, where a D-PHY interface consists of one clock lane and anywhere from one to four data lanes configured to communicate with another MIPI-compliant device using the same number of lanes.

In both FIGS. 2 and 3, switch 110 is connected between power and IN1P. Switch 112 connects IN2P to either INP or TXOUTP. Switch 118 connects IN2N to either TXOUTN or INN. Switch 120 is connected between power and IN1N, respectively.

FIG. 2 shows the receiver 100 in normal operation. In this mode, switch 110 is in an open position, and switch 112 connects INP to both IN1P and IN2P, allowing signals from INP to be routed to IN1P and IN2P. Similarly, switch 120 is open and switch 118 connects INN to IN1N and IN2N.

FIG. 3 shows the receiver 100 in the loopback mode. In this mode, switch 110 is closed to connect INP and IN1P to power. Switch 112 connects TXOUTP to IN2P, and switch 118 connects TXOUTN to IN2N. switch 120 shorts INN and IN1N to power. The output of the receiver 100 tracks the internal transmitter output in this mode.

Figure 4:
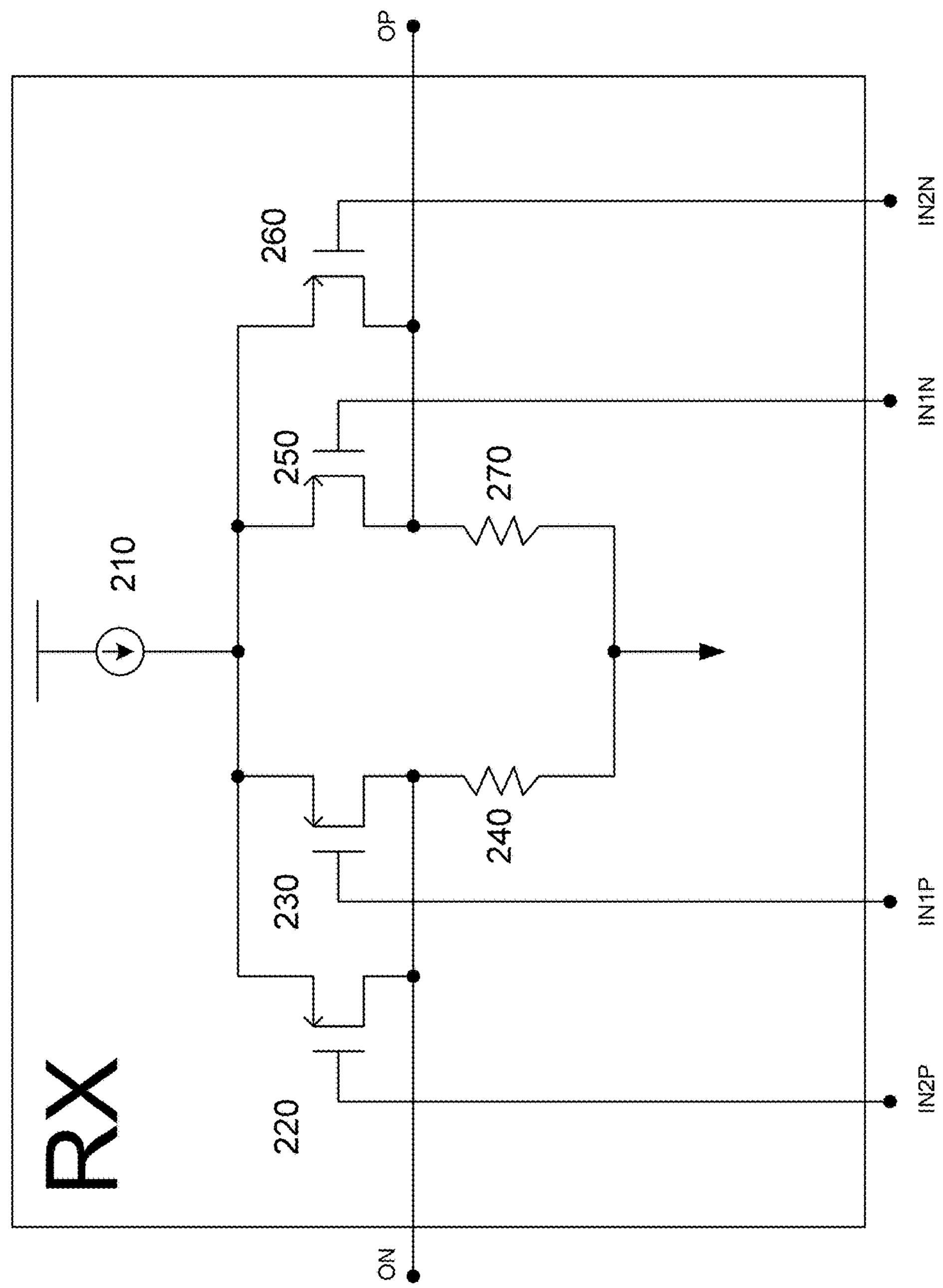
FIG. 4 shows in more detail a receiver 100 in FIGS. 2-3.

In one embodiment shown in FIG. 4, the receiver RX includes a current source 210 connected to source terminals of first and second positive input transistors 220-230 and first and second negative input transistors 250-260, and a first resistor 240 connected to drain terminals of the first and second positive input transistors, and a second resistor 270 connected to drain terminals of the first and second negative input transistors.

Figure 5:
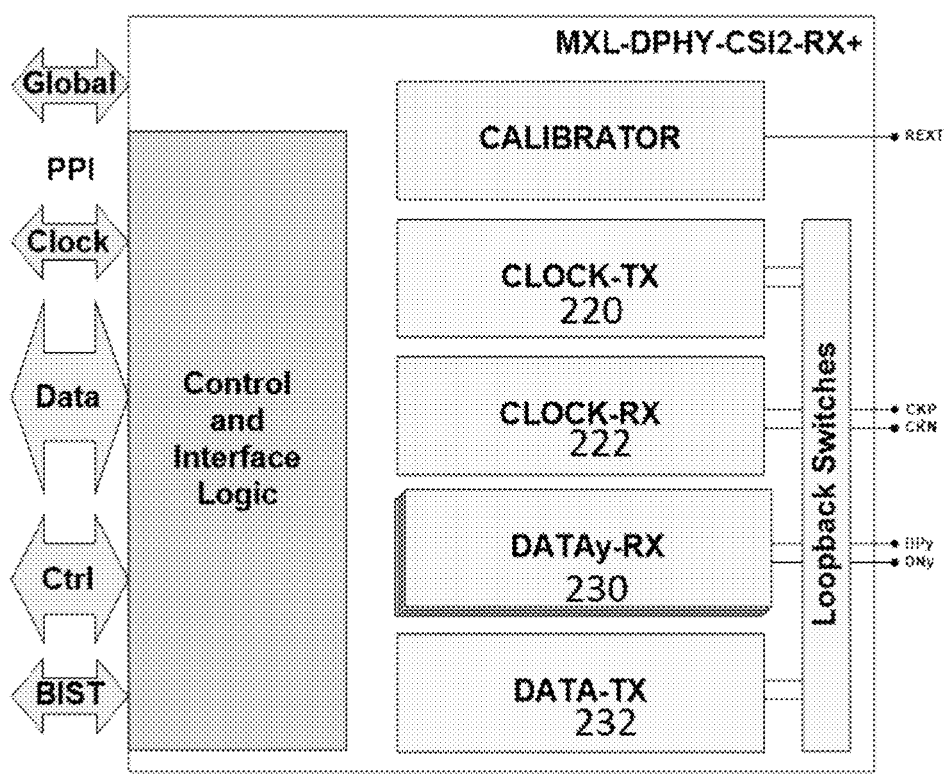
FIG. 5 shows an exemplary MIPI D-PHY system using the invention.

One implementation of the MIPI D-PHY compliant $RX^+$ configuration combines the small area and improved performance of RX configuration with the testability and diagnostics that are possible with Universal lane configuration, the best of both worlds. FIG. 5 shows an exemplary DPHY $RX^+$ configuration with connections to clock, data, control signals, as well as self test (BIST) signals. The clock, data, control signals, as well as self test (BIST) signals are processed by a control and interface logic 210. In turn, the control and interface logic 210 drives a transmit clock 220, a receive clock 222, a plurality of data receivers 230, and a data transmitter 232. Since the D-PHY TX area is significantly larger than that of RX, this configuration has smaller area and standby current, as only two transmitters are need instead of the five transmitters that would be needed for a conventional 4 data-lanes Universal lane configuration. The reduction in area is about 35% while standby power reduction is about 50%.

The $RX^+$ configuration has clear advantage in many aspects. The $RX^+$ configuration enables early detection and diagnosis of faults through the whole life cycle of the product from wafer-sort all the way to in-system testability. It also simplifies ATE requirements, and enables at-speed testing (production and in-system), with minimal increase in area. This unique MIPI compliant configuration results in area and power savings and improved testability in full-speed production test and in in-system testability and diagnostics. It combines the testability of universal lane with the small size and improved performance of RX only configuration.

The embodiment of FIG. 5 supports MIPI® Specification for D-PHY Version 1.2. One embodiment features four lanes in Slave D-PHY and supports both high speed and low-power modes. This embodiment is capable of 80 Mbps to 1.5 Gbps data rate per lane in D-PHY mode without de-skew calibration and up to 2.5 Gbps data rate per lane in D-PHY mode with DeSkew calibration. The embodiment can reach 10 Mbps data rate in low-power mode. Overall, the system offers low power consumption. Loopback testability support is provided, and resistance termination calibration is also handled. The system achieves full-speed production and in-system testability independent of external load. The system greatly simplifies ATE requirements.

FIG. 6 shows an exemplary process to test the receiver 100. The process includes:

Set Receiver lane pointer to 0 (400)
Set switches to loop-back mode (402)
Drive test signals to Receiver from Transmitter (404)
If test fails, indicate current receiver as failing (406)
Increment receiver lane pointer (408)
Are there more receiver lanes to test? (410)
If yes, loop to 404, otherwise exit (412)

Elimination of multiple Transmitters results in a smaller area and lower leakage current. The transmitter used is simplified smaller area version, and signal integrity is improved due to reduced output capacitance.

While the present system operates with D-PHY, the inventor contemplates that the system also works with M-PHY® which uses differential signaling (on two wires) and C-PHY which provides camera and display applications with 3 phase encoding on a three-wire interface. Although the present disclosure has been described in the context of a custom ASIC, configurations using other types of electronic devices, such as mask-programmable field arrays (MPGAs) and application-specific integrated circuits (ASICs), having no or limited numbers of MIPI interfaces, are also possible.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes, ports, or paths may be referred to by the same name and are interchangeable for purposes here.

As used herein in reference to an element and a standard, the term "compliant" mean that the element communicates with other elements in a manner wholly or partially specified by the standard, and would be recognized by other elements as sufficiently capable of communicating with the other elements in the manner specified by the standard. The compliant element does not need to operate internally in a manner specified by the standard.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A circuit, comprising:

control and interface logic coupled to clock, data, control and test signals;

transmitter and receiver clock circuits coupled to the control and interface logic;

a single data transmitter coupled to the control and interface logic;

a plurality of data receivers coupled to control and interface logic and the single data transmitter, the data receivers having a loop-back mode coupled to the single data transmitter for sequentially performing self-test on each data receiver, wherein the receiver has first and second differential input pairs and one differential output pair, the receiver outputting the first differential inputs at the differential outputs in a first mode and applying test signals to the second differential inputs and outputting the second differential inputs at the differential outputs in a second mode; and switches coupled to the first and second differential inputs to disconnect the test input signals from the second differential inputs during the first mode and to disable the receiver input signals by connecting first differential inputs to local core voltage while tri-stating a transmitter on another side of a link during the second mode.

2. The circuit of claim 1, wherein each of the inputs and outputs comprises a differential pair of signals.

3. The circuit of claim 2, wherein the receiver comprises a MIPI differential physical (D-PHY) receiver.

4. The circuit of claim 2, wherein the receiver comprises a current source connected to drain terminals of first and second positive input transistors and first and second negative input transistors, and a first resistor connected to source terminals of the first and second positive input transistors, and a second resistor connected to source terminals of the first and second negative input transistors.

5. The circuit of claim 1, wherein the second mode comprises a loop-back test mode.

6. The circuit of claim 1, wherein the first mode comprises a receiver mode where the outputs track the first inputs.

7. The circuit of claim 1, wherein the switches connect a resistor between either first or second input ports.

8. A MIPI differential physical (D-PHY) system, comprising:

control and interface logic coupled to clock, data, control and test signals;

transmitter and receiver clock circuits coupled to the control and interface logic;

a single data transmitter coupled to the control and interface logic; and a plurality of data receivers coupled to control and interface logic and the single data transmitter, the data receivers having a loop-back mode coupled to the single data transmitter for sequentially performing self-test on each data receiver.

9. The system of claim 8, wherein each receiver comprises:

a receiver having first and second differential input pairs and one differential output pair, the receiver outputting the first differential inputs at the differential outputs in a first mode and applying test signals to the second differential inputs and outputting the second differential inputs at the differential outputs in a second mode; and switches coupled to the first and second differential inputs to disconnect the test input signals from the second differential inputs during the first mode and to disable the receiver input signals by connecting first differential inputs to local core voltage while tri-stating the transmitter on the other side of the link during the second mode.

10. The system of claim 9, wherein each of the inputs and outputs comprises a differential pair of signals.

11. The system of claim 8, wherein a second mode comprises a loop-back test mode.

12. The system of claim 8, wherein a first mode comprises a receiver mode where differential outputs track differential inputs.

13. The system of claim 8, wherein the switches connect a resistor between either first or second differential input ports.

14. The system of claim 8, wherein the receiver comprises a current source connected to source terminals of first and second positive input transistors and first and second negative input transistors, and a first resistor connected to drain terminals of the first and second positive input transistors, and a second resistor connected to drain terminals of the first and second negative input transistors.

15. A method for testing a MIPI differential physical (D-PHY) system having a control and interface logic coupled to clock, data, control and test signals; transmitter and receiver clock circuits coupled to the control and interface logic; a single data transmitter coupled to the control and interface logic; and a plurality of data receiver coupled to control and interface logic and the single data transmitter, the data receivers having a loop-back mode coupled to the single data transmitter for sequentially performing self-test on each data receiver, comprising:

setting the receiver to the loop-back mode;

driving the receiver with the test signal from a transmitter; and determining if the receiver output matches the transmitter output.

16. The method of claim 15, comprising flagging a failing receiver.

17. The method of claim 15, comprising testing the next receiver using the same transmitter.

18. The method of claim 15, wherein the receiver comprises a MIPI differential physical (D-PHY) receiver.

19. The method of claim 15, wherein switches connect a resistor between either the first or second differential input ports.

20. The method of claim 15, wherein a first mode comprises a receiver mode where differential outputs track differential inputs.

* * * * *